United States Patent
Vundavalli et al.

(10) Patent No.: US 10,466,275 B1
(45) Date of Patent: Nov. 5, 2019

(54) GLITCH DETECTOR AND TEST GLITCH GENERATOR

(71) Applicant: Xilinx, Inc., San Jose, CA (US)

(72) Inventors: Sandeep Vundavalli, Secunderabad (IN); Sree RKC Saraswatula, Hyderabad (IN); James D. Wesselkamper, Albuquerque, NM (US); Santosh Yachareni, Hyderabad (IN); Shidong Zhou, Milpitas, CA (US); Anil Kumar Kandala, Hyderabad (IN)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 16/022,403

(22) Filed: Jun. 28, 2018

(51) Int. Cl.
| | |
|---|---|
| *G11C 29/00* | (2006.01) |
| *G01R 11/24* | (2006.01) |
| *G01R 31/30* | (2006.01) |
| *G06F 21/86* | (2013.01) |
| *G06F 21/76* | (2013.01) |
| *G01R 22/06* | (2006.01) |

(52) U.S. Cl.
CPC ............ *G01R 11/24* (2013.01); *G01R 22/066* (2013.01); *G01R 31/3004* (2013.01); *G06F 21/76* (2013.01); *G06F 21/86* (2013.01)

(58) Field of Classification Search
CPC .. G01R 11/24; G01R 22/066; G01R 31/3004; G01R 21/76; G01R 21/86
See application file for complete search history.

(56) References Cited

U.S. PATENT DOCUMENTS

| 6,751,079 B2* | 6/2004 | Bretschneider .. G01R 19/16538 361/90 |
| 7,085,979 B2* | 8/2006 | Kim ..................... G06K 19/073 714/733 |
| 7,483,328 B2* | 1/2009 | Kim ......................... G11C 7/02 365/189.07 |
| 10,156,595 B2* | 12/2018 | Nirwan ................ G01R 19/165 |
| 2003/0226082 A1 | 12/2003 | Kim et al. |

* cited by examiner

*Primary Examiner* — Pho M Luu
(74) *Attorney, Agent, or Firm* — Patterson + Sheridan, LLP

(57) ABSTRACT

Apparatus and associated methods relate to a glitch detection circuit monitoring a duration that a selected fractional supply voltage is below a predetermined voltage threshold. The selected fractional supply voltage may be at the predetermined threshold when the supply voltage is between a valid circuit-supply voltage and a power-on circuit-reset (POR). A glitch detect signal may be generated, for example, when the monitored duration is greater than a predetermined duration threshold. A test glitch generator may generate a test glitch, for example, having selectable voltage and duration, which may be selectably applied to the glitch detection circuit to verify operation. Various exemplary glitch detection circuits may advantageously determine externally produced tampering attempts by detecting circuit-supply voltages and durations that meet specific selectable supply voltage and duration criteria, improving security of sensitive field programmable gate array (FPGA) data by taking protective action in response to the detection.

20 Claims, 10 Drawing Sheets

GLITCH DETECTOR AND TEST GLITCH GENERATOR

TECHNICAL FIELD

Various embodiments relate generally to detection of transient glitches on a monitored voltage signal.

BACKGROUND

Corporations, industries, public and private entities may all include various security aspects. Some entities may own non-portable physical assets/inventory (e.g., land, buildings) that can be locked to secure against unauthorized entry. Some entities may own portable physical assets/inventory that may be placed in a secure area or that may be locked onto immovable objects. In some examples, retail centers may allow customers free access to store merchandise while shopping within the confines of the retail center and may employ electronic anti-theft devices and/or security personnel near the store exits.

Various printed materials, works of art, motion pictures, architectural plans and electronic products may include copyrights. Similarly, various electronic products, for example, field programmable gate arrays (FPGAs) may be programmed with proprietary software to perform a myriad of functions.

SUMMARY

Apparatus and associated methods relate to a glitch detection circuit monitoring a duration that a selected fractional supply voltage is below a predetermined voltage threshold. In an illustrative example, the selected fractional supply voltage may be at the predetermined threshold when the supply voltage is between a valid circuit-supply voltage and a power-on circuit-reset (POR). A glitch detect signal may be generated, for example, when the monitored duration is greater than a predetermined duration threshold. A test glitch generator may generate a test glitch, for example, having selectable voltage and duration, which may be selectably applied to the glitch detection circuit to verify operation. Various exemplary glitch detection circuits may advantageously determine externally produced tampering attempts by detecting circuit-supply voltages and durations that meet specific selectable supply voltage and duration criteria, improving security of sensitive field programmable gate array (FPGA) data by taking protective action in response to the detection.

Various embodiments may achieve one or more advantages. For example, some embodiments may provide an array of selectable trip points ranging between a valid supply voltage and a power-on reset threshold. Various embodiments may provide a stable and reliable glitch detection threshold over process, voltage and temperature (PVT). Various examples of glitch detection implementations may have a response time less than glitch durations used for tampering with an FPGA encryption key. Various implementations may advantageously detect and/or safeguard against operation of an integrated circuit (IC) outside of a valid supply range. Some embodiments may advantageously allow generation of various test glitches. Various examples of glitch detection implementations may detect varied types of power source tampering in combination, for example, deep glitches of short duration in combination with shallow glitches of long duration.

In an exemplary aspect, an integrated circuit (IC) tamper detection apparatus may include a glitch detection circuit configured to receive a predetermined reference voltage signal (VREF) and a monitored supply voltage signal (MVSUPPLY), which is a function of a main supply voltage signal (VMAIN) configured to supply operating power to a target circuit. The glitch detection circuit may include a first voltage divider configured to generate a plurality of voltage signals, each of the voltage signals representing a fraction of the MVSUPPLY voltage. It may further include a first selection circuit configured to select one of the plurality of voltage signals in response to a glitch depth selection signal, and a comparator operably coupled to receive and compare the selected one of the plurality of voltage signals and the VREF to generate a depth detection signal (DEPTH_DET) in response to the MVSUPPLY transitioning from a nominal supply voltage range for the target circuit to a range between a minimum operating voltage and a power-on-reset voltage threshold for the target circuit. The apparatus may further include a glitch duration filter configured to receive the DEPTH_DET and a glitch width selection signal, the glitch duration filter configured to generate a glitch detection signal (DEPTH+WIDTH_DET) in response to the duration of the depth detection signal (DEPTH_DET) exceeding a selected glitch width responsive to the glitch width selection signal.

In some embodiments of the apparatus, the glitch detection circuit may further include a latch configured to generate a latched glitch detection signal (GLITCH_DET_LATCHED) in response to the DEPTH+WIDTH_DET. An input selection circuit may be configured to generate the MVSUPPLY, the input selection circuit comprising a test glitch generator configured to generate a test glitch signal, and a second selection circuit configured to generate the MVSUPPLY by selecting between the VMAIN and the test glitch signal. The test glitch generator may be further configured to generate a test glitch signal in response to a signal indicating an amplitude and a duration of the test glitch signal. The test glitch generator may further include a second voltage divider configured to generate a plurality of test voltage signals, each of the test voltage signals representing a fraction of a test supply voltage. The test glitch generator may further include a third selection circuit configured to select one of the plurality of test voltage signals.

The IC tamper detection apparatus may further include at least two of the glitch detection circuits, wherein each of the at least two glitch detection circuits receives a unique combination of the glitch depth selection signal and the glitch width selection signal.

The glitch detection circuit may be further configured to receive its operating power from a supply voltage signal sourced with respect to the VMAIN. A reference and supply circuit may be configured to generate and regulate the VREF. The reference and supply circuit may further include a regulator to generate and supply power to the glitch detection circuit. The comparator may be further operable to compare the selected one of the plurality of voltage signals and the VREF to generate a depth detection signal (DEPTH_DET) in response to the MVSUPPLY transitioning from a nominal supply voltage range for the target circuit to a range between a minimum operating voltage and a minimum specified power-on-reset voltage threshold for the target circuit.

In one exemplary aspect, a method of operating an integrated circuit (IC) includes receiving, with a glitch detection circuit, a predetermined reference voltage signal (VREF) and a monitored supply voltage signal (MVSUP- PLY), which is a function of a main supply voltage signal (VMAIN) configured to supply operating power to a target circuit. The glitch detection circuit is operable to perform operations, including generating, with a first voltage divider, a plurality of voltage signals. Each of the voltage signals represents a fraction of the MVSUPPLY voltage. The operations further include selecting, with a first selection circuit, one of the plurality of voltage signals in response to a glitch depth selection signal; receive and compare, with a comparator, the selected one of the plurality of voltage signals and the VREF to generate a depth detection signal (DEPTH_DET) in response to the MVSUPPLY transitioning from a nominal supply voltage range for the target circuit to a range between a minimum operating voltage and a power-on-reset voltage threshold for the target circuit; and, receiving, with a glitch duration filter, the DEPTH_DET and a glitch width selection signal, the glitch duration filter configured to generate a glitch detection signal (DEPTH+WIDTH_DET) in response to the duration of the depth detection signal (DEPTH_DET) exceeding a selected glitch width responsive to the glitch width selection signal.

In some embodiments of the method, the glitch detection circuit may be operable to perform operations such as generating, with a latch, a latched glitch detection signal (GLITCH_DET_LATCHED) in response to the DEPTH+WIDTH_DET. The method may include generating, with an input selection circuit, the MVSUPPLY, the input selection circuit comprising a test glitch generator configured to generate a test glitch signal, and a second selection circuit configured to generate the MVSUPPLY by selecting between the VMAIN and the test glitch signal. The method may further include generating, with the test glitch generator, a test glitch signal in response to a signal indicating an amplitude and a duration of the test glitch signal. The test glitch generator may include a second voltage divider, and the method may further include generating, with the second voltage divider, a plurality of test voltage signals, each of the test voltage signals representing a fraction of a test supply voltage. The test glitch generator may further include a third selection circuit for selecting one of the plurality of test voltage signals. The method may further include generating and regulating the VREF with a reference and supply circuit, wherein the reference and supply circuit may further include a regulator, and the method may further include generating and supplying power, with the regulator, to the glitch detection circuit.

The method may further include comparing, with the comparator, the selected one of the plurality of voltage signals and the VREF to generate a depth detection signal (DEPTH_DET) in response to the MVSUPPLY transitioning from a nominal supply voltage range for the target circuit to a range between a minimum operating voltage and a minimum specified power-on-reset voltage threshold for the target circuit.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

To aid understanding, this document is organized as follows. First, an exemplary application is briefly introduced with reference to FIG. 1. Second, with reference to FIGS. 2-4, the discussion turns to an exemplary implementation, including waveforms associated with glitch depth detection and glitch width detection. Next, with reference to FIGS. 5-7 exemplary test glitch generators are presented, including associated waveforms. Next, with reference to FIG. 8, a flowchart of an exemplary glitch detector is presented. Next, with reference to FIG. 9 an OR'ed implementation of exemplary test glitch generators is presented. Finally, with reference to FIG. 10, an exemplary programmable integrated circuit (IC) on which the disclosed circuits and processes may be implemented is described.

Figure 1:
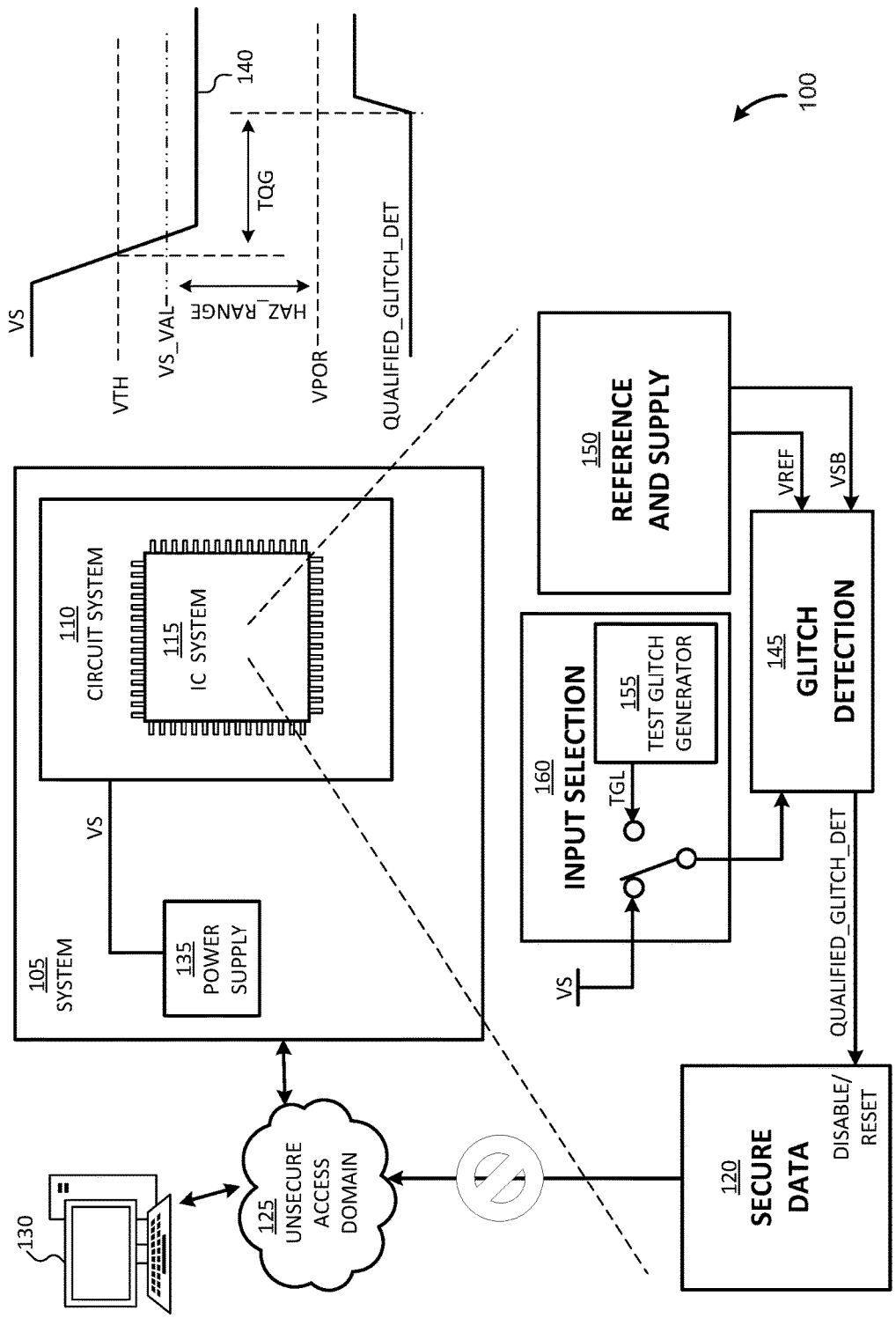
FIG. 1 depicts a detection circuit in an integrated circuit (IC) detecting glitches on a power supply, the detection circuit disabling unauthorized access of secure data.

FIG. 1 depicts a detection circuit in an integrated circuit (IC) detecting glitches on a power supply, the detection circuit disabling unauthorized access of secure data. A detection scenario 100 includes a target electronic system 105. The target electronic system 105 includes a circuit system 110, for example, a motherboard. The circuit system 110 includes an IC system 115, for example, a field programmable gate array (FPGA). The IC system 115 includes a memory block containing secure data 120. The secure data 120 may be, for example, preprogrammed instructions for configuration of the IC system 115. The configuration may be proprietary, for example, and may enable the IC system 115 and the system 105 to perform one or more functions in a unique way.

The system 105 may be linked by an unauthorized unsecure access domain 125. The unsecure access domain 125 may be linked by a user-hacker system 130. A user-hacker on the user-hacker system 130 may attempt unauthorized access of the secure data 120 on the system 105. The user-hacker may intend to acquire the secure data 120 to illegally produce a competing product.

The system 105 includes a power supply 135. The user-hacker may nefariously devise a method to modify normal functionality of the power supply 135 to produce a voltage glitch 140 on a supply voltage VS. The voltage glitch 140 may drop below a minimum valid operating voltage VS_VAL of the IC system 115 and may be high enough above a power-on-reset threshold voltage VPOR to mitigate a power-on-reset from the IC system 115, yet low enough that proper functioning of the IC is not guaranteed. Accordingly, the user-hacker may exploit a potentially unsecured range HAZ_RANGE, where the supply voltage VS is above the automatic power-on-reset VPOR from the IC system 115, and below the minimum valid operating voltage VS_VAL. Operating the IC system 115 in the potentially unsecured range HAZ_RANGE may allow tampering with, and access to various inner workings of the IC system 115, for example, access to the secure data 120.

The IC system 115 includes a glitch detection circuit 145. The glitch detection circuit 145 is powered by a standby voltage VSB. The glitch detection circuit 145 receives a reference voltage VREF and receives the supply voltage VS. The standby voltage VSB and reference voltage VREF are produced by a reference and supply circuit 150. The glitch detection circuit 145 is operative to internally produce one or more divided supply voltages, each may be a percentage of the supply voltage VS. In operation, the glitch detection circuit 145 compares a selected divided supply voltage with the reference voltage VREF. The selected divided supply voltage reaching the reference voltage VREF may be indicative of the supply voltage VS reaching a predetermined threshold VTH.

The result of the comparison is further qualified with a glitch duration filter (not shown). The glitch detection circuit 145 is operative to produce a qualified glitch detection signal QUALIFIED_GLITCH_DET in response to a supply voltage glitch, for example, voltage glitch 140 that is lower than the predetermined threshold VTH and longer than a predetermined duration TQG. The qualified glitch detection signal QUALIFIED_GLITCH_DET may enable various logic circuits (e.g., platform management controllers) to mitigate access to the secure data 120 by disabling and/or resetting various functions on the IC system 115.

Operation of the glitch detection circuit 145 may be tested by application of a test glitch TGL produced by a test glitch generator 155. An input selection circuit 160, included in the IC system 115, selects between two inputs to the glitch detection circuit 145 (1) the supply voltage VS, and (2) the test glitch TGL from the test glitch generator 155. The test glitch generator 155 may advantageously produce test glitches TGL of controlled depth and duration to verify proper operation of the glitch detection circuit 145. In various examples, the glitch detection circuit 145 may generate a glitch detection signal (DEPTH+WIDTH_DET) in response to a duration of a depth detection signal (DEPTH_DET) exceeding a selected glitch width responsive to a glitch width selection signal.

Figure 2:
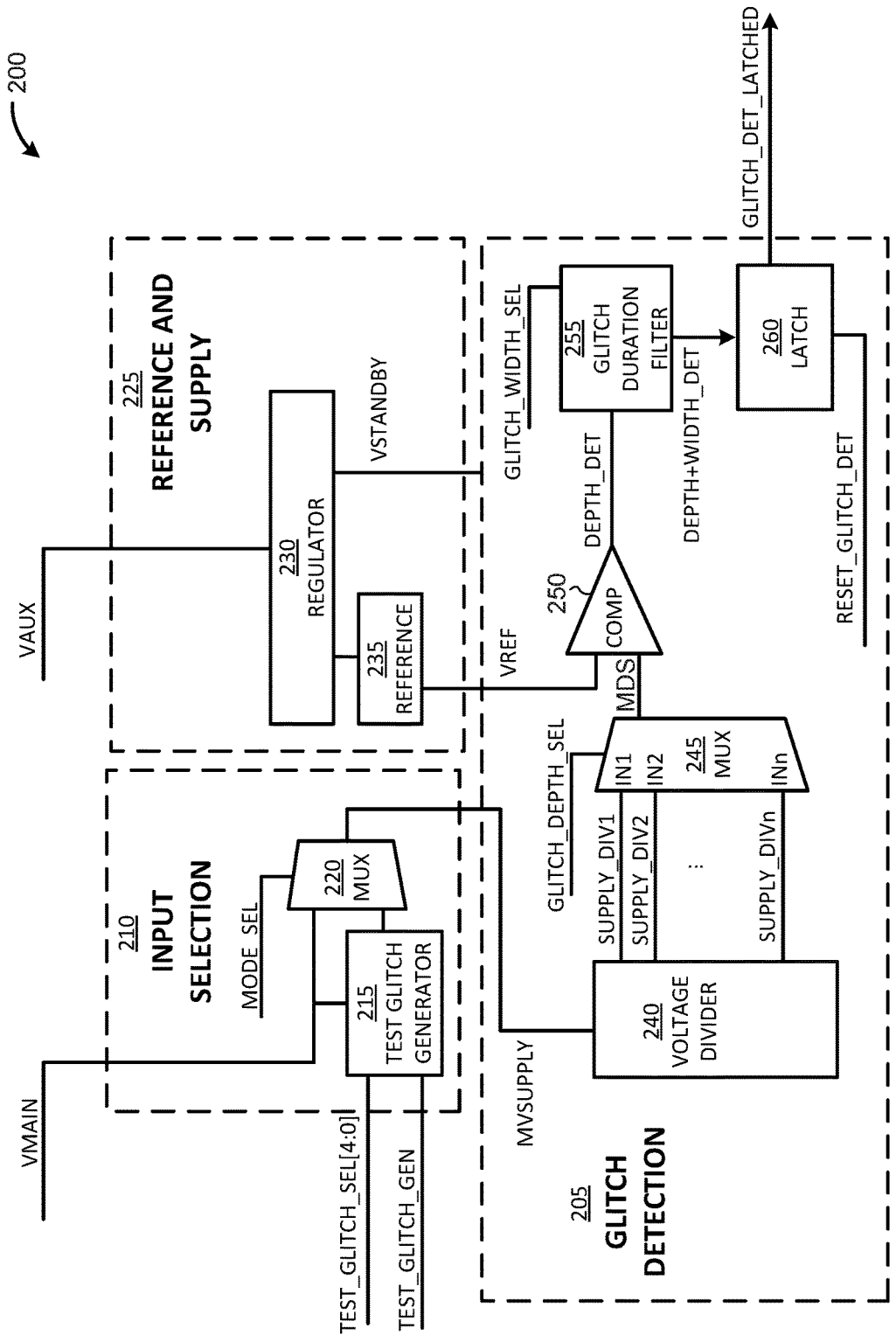
FIG. 2 depicts a block diagram of an exemplary tamper detection implementation.

FIG. 2 depicts a block diagram of an exemplary tamper detection implementation. A tamper detection circuit 200 includes a glitch detection subcircuit 205. The glitch detection subcircuit 205 may be the glitch detection circuit 145 (FIG. 1). The glitch detection subcircuit 205 receives a monitored supply voltage MVSUPPLY. The glitch detection subcircuit 205 is operative to produce a main supply glitch detection signal GLITCH_DET_LATCHED in response to a glitch on the monitored supply voltage MVSUPPLY, the glitch having a glitch depth selected by a glitch depth selection signal GLITCH_DEPTH_SEL, and having a glitch duration selected by a glitch width select signal GLITCH_WIDTH_SEL.

The monitored supply voltage MVSUPPLY is produced by an input selection subcircuit 210. The input selection subcircuit 210 may be the input selection circuit 160 (FIG. 1). The input selection subcircuit 210 receives a main supply input voltage VMAIN. In various examples, the main supply input voltage VMAIN may be an FPGA main supply input voltage and may provide the main input power to the FPGA.

The input selection subcircuit 210 is operative to produce a monitored supply voltage MVSUPPLY in response to a mode selection signal MODE_SEL. The mode selection signal MODE_SEL in a first logic state is operative to produce the main supply input voltage VMAIN onto the monitored supply voltage MVSUPPLY. The mode selection signal MODE_SEL in a second logic state is operative to produce a programmable test glitch signal from a test glitch generator 215 onto the monitored supply voltage MVSUPPLY. A multiplexer 220 selects between the main supply input voltage VMAIN and the programmable test glitch to produce the monitored supply voltage MVSUPPLY in response to the mode selection signal MODE_SEL.

The glitch detection subcircuit 205 receives a reference voltage VREF and a standby supply voltage VSTANDBY from a reference and supply subcircuit 225. The reference and supply subcircuit 225 may be the reference and supply circuit 150 (FIG. 1). The glitch detection subcircuit 205 is powered by the standby supply voltage VSTANDBY. The reference and supply subcircuit 225 receives an auxiliary supply VAUX. The reference and supply subcircuit 225 is operative to produce the reference voltage VREF and the standby supply voltage VSTANDBY in response to receiving input power from the auxiliary supply VAUX. The standby supply voltage VSTANDBY is produced by a regulator 230. In various examples, the regulator 230 may be a low drop out (LDO) regulator. The regulator 230 is supplied by the auxiliary supply VAUX. The regulator 230 supplies a reference circuit 235. The reference circuit 235 produces the reference voltage VREF. The reference circuit may include, for example, a bandgap voltage reference device.

The glitch detection subcircuit 205 receives the monitored supply voltage MVSUPPLY from the input selection subcircuit 210. A voltage divider circuit 240 receives the monitored supply voltage MVSUPPLY. The voltage divider circuit 240 produces one or more (n) divided monitor voltages SUPPLY_DIVn. In various embodiments, the voltage divider circuit 240 may be implemented with a resistor divider. The resistor divider may produce one or more (n) taps. The taps may be the divided monitor voltages SUPPLY_DIVn.

A multiplexer 245 is configured to receive the divided monitor voltages SUPPLY_DIVn. The multiplexer 245 produces a MVSUPPLY derived signal MDS in response to the glitch depth selection signal GLITCH_DEPTH_SEL. A comparator 250 is configured to receive the selected MVSUPPLY derived signal MDS and to receive the reference voltage VREF. The comparator 250 is operative to produce a glitch depth detection signal DEPTH_DET in response to the selected MVSUPPLY derived signal MDS dropping below the reference voltage VREF.

In an illustrative example, the tamper detection circuit 200 may be configured to monitor the main supply input voltage VMAIN, which may have a nominal voltage of 0.850 volts. In this example, the multiplexer 220 may be configured by the mode selection signal MODE_SEL to produce the main supply input voltage VMAIN onto the monitored supply voltage MVSUPPLY. The reference circuit 235 may be preconfigured to produce a reference voltage VREF of 0.500 volts. The voltage divider 240 may be preconfigured to produce a divided monitor voltage SUPPLY_DIV2 of 0.500 volts when the main supply input voltage VMAIN is at 80% of its nominal voltage. The glitch depth selection signal GLITCH_DEPTH_SEL may be configured to control the multiplexer 245 to pass the divided monitor voltage SUPPLY_DIV2 to the output of the multiplexer 245. Accordingly, when the main supply input voltage VMAIN drops below 80% of its nominal value, for example, the comparator 250 may indicate a detected glitch on the glitch depth detection signal DEPTH_DET.

A glitch duration filter 255 is configured to receive the glitch depth detection signal DEPTH_DET. The glitch duration filter 255 produces a depth-plus-width detection signal DEPTH+WIDTH_DET in response to a duration of the glitch depth detection signal DEPTH_DET greater than or equal to a duration selected by the glitch width selection signal GLITCH_WIDTH_SEL. For example, for the glitch width selection signal GLITCH_WIDTH_SEL indicative of 2 nS, input glitch depth detection signals DEPTH_DET of durations greater than or equal to 2 nS may be passed through the glitch duration filter 255 to the depth-plus-width detection signal DEPTH+WIDTH_DET. Accordingly, input glitch depth detection signals DEPTH_DET of duration less than 2 nS may not be passed through the glitch duration filter 255. In some examples, the glitch duration filter 255 may advantageously mitigate nuisance (e.g., false-positive) detection of innocuous transient glitches.

The depth-plus-width detection signal DEPTH+WIDTH_DET is operative to pass through only qualified glitches. A qualified glitch may be both lower than a predetermined depth threshold and longer than a predetermined duration threshold. Qualified glitches originating from the main supply input voltage VMAIN may indicate that an integrated circuit (IC) that embodies the tamper detection circuit 200 is experiencing nefarious tampering. In various examples, the glitch detection subcircuit 205 may generate a glitch detection signal (e.g., depth-plus-width detection signal (DEPTH+WIDTH_DET)) in response to a duration of the depth detection signal (DEPTH_DET) exceeding a selected glitch width responsive to a glitch width selection signal (e.g., GLITCH_WIDTH_SEL).

A latch 260 is configured to receive the depth-plus-width detection signal DEPTH+WIDTH_DET. The latch 260 is operative to hold the depth-plus-width detection signal DEPTH+WIDTH_DET when the glitch duration filter 255 detects a qualified glitch. The latch 260 generates a latched main supply glitch detection signal GLITCH_DET_LATCHED in response to the depth-plus-width detection signal DEPTH+WIDTH_DET indicating a qualified glitch. The latched main supply glitch detection signal GLITCH_DET_LATCHED may hold the qualified glitch indication until a reset control circuit and/or process can manage the qualified glitch indication. The latch 260 receives a reset signal RESET_GLITCH_DET. The reset signal RESET_GLITCH_DET may be activated by the reset control circuit and/or process to acknowledge and clear the qualified glitch indication. In various implementations, the reset signal RESET_GLITCH_DET may be a signal from a platform management controller (PMC) register. In some instances, the PMC register may be controlled by firmware. In various examples, the latched main supply glitch detection signal GLITCH_DET_LATCHED may advantageously capture and hold a detected glitch event until it is successfully registered.

Figure 3:
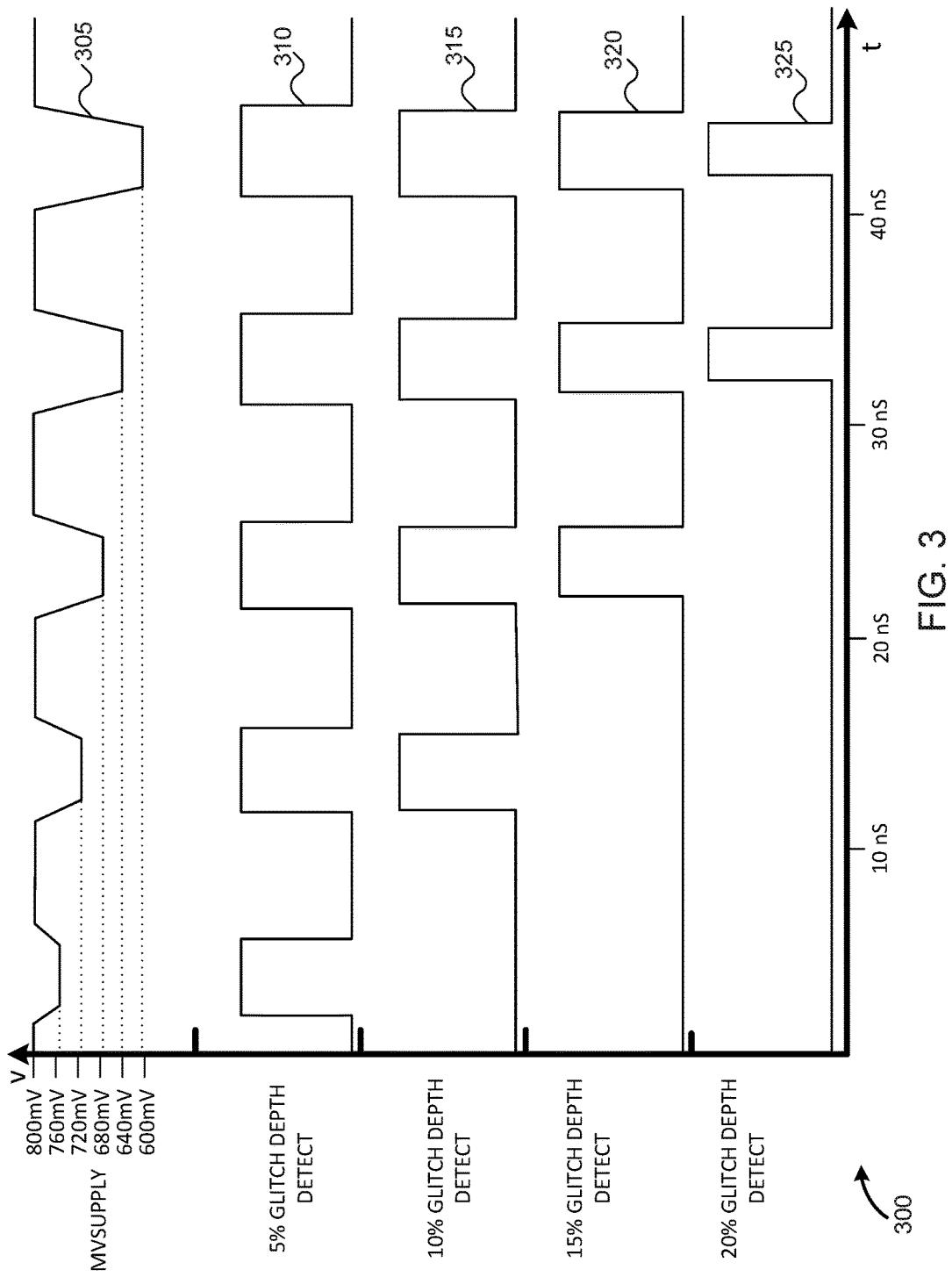
FIG. 3 depicts a set of glitch depth detection waveforms of an exemplary glitch detection subcircuit.

FIG. 3 depicts a set of glitch depth detection waveforms of an exemplary glitch detection subcircuit. A glitch detection response chart 300 includes a time domain MVSUPPLY response signal 305. The MVSUPPLY response signal 305 may be the monitored supply voltage MVSUPPLY of FIG. 2. In some examples, the MVSUPPLY response signal 305 may be the main supply input voltage VMAIN (FIG. 2), when the mode selection signal MODE_SEL (FIG. 2) is in the first logic state. In some examples, the MVSUPPLY response signal 305 may be the programmable test glitch from the test glitch generator 215 (FIG. 2), when the mode selection signal MODE_SEL in the second logic state.

The glitch detection response chart 300 includes four exemplary time domain glitch depth detection response signals. The glitch depth detection signals may be the glitch depth detection signal DEPTH_DET (FIG. 2). In some examples, the glitch depth detection signals may activate (e.g., produce a logic high) in response to the MVSUPPLY derived signal MDS dropping below the reference voltage VREF (FIG. 2).

In the depicted glitch depth detect examples, in the glitch detection response chart 300, the multiplexer 245 (FIG. 2) connects one of n inputs, where n=4 in this example, to the output of the multiplexer 245. For example, IN1, IN2, IN3 and IN4 may connect one of the divided monitor voltages (e.g., SUPPLY_DIV1, SUPPLY_DIV2, SUPPLY_DIV3, SUPPLY_DIV4) to the output of the multiplexer 245. At the comparator 250, the selected divided supply is compared to the reference voltage VREF. When the selected divided supply drops below the reference voltage VREF, then the comparator 250 (FIG. 2) signals a detected glitch. The divided supplies may be determined by the voltage divider 240 (FIG. 2) preconfigured to satisfy the following equations:

$$SUPPLY\_DIV1 = \frac{VREF}{MVSUPPLY_{NOM} * (100\% - 5\%)} * MVSUPPLY$$

$$SUPPLY\_DIV2 = \frac{VREF}{MVSUPPLY_{NOM} * (100\% - 10\%)} * MVSUPPLY$$

$$SUPPLY\_DIV3 = \frac{VREF}{MVWSUPPLY_{NOM} * (100\% - 15\%)} * MVSUPPLY$$

$$SUPPLY\_DIV4 = \frac{VREF}{MVSUPPLY_{NOM} * (100\% - 20\%)} * MVSUPPLY$$

Where:
$MVSUPPLY_{NOM}$=Nominal supply voltage
VREF=Reference voltage choosen to be approx 85% of MVSUPPLY In response to the MVSUPPLY voltage levels, when the multiplexer 245 is set for 5% glitch detection by the glitch depth selection signal GLITCH_DEPTH_SEL, a 5% glitch detection response signal 310 detects glitch depths of 5% or more.

In response to the MVSUPPLY voltage levels, when the multiplexer 245 is set for 10% glitch detection, a 10% glitch detection response signal 315 detects glitch depths of 10% or more.

In response to the MVSUPPLY voltage levels, when the multiplexer 245 is set for 15% glitch detection, a 15% glitch detection response signal 320 detects glitch depths of 15% or more.

In response to the MVSUPPLY voltage levels, when the multiplexer 245 is set for 20% glitch detection, a 20% glitch detection response signal 325 detects glitch depths of 20% or more.

The example of FIG. 3 depicts a set of glitch depth detection waveforms. The value of the reference voltage VREF and the values of the divided monitor voltages SUPPLY_DIVn and their representations of percentages of nominal monitored supply voltages MVSUPPLY are provided purely as examples. For example, in various circuit implementations, the divided supplies may be progressive step sizes (e.g., 95%, 88%, 80%, 70%). In some examples, the voltage divider 240 may produce one or more voltage taps, the multiplexer 245 receiving and multiplexing each tap. In various examples, the number of and values of the divided monitor voltages SUPPLY_DIVn may be advantageously adapted to suit the application.

In an illustrative example, the main supply input voltage VMAIN may be about 0.95 volts, 0.85 volts, 0.75 volts, 0.675 volts or about 0.65 volts or less. The reference voltage VREF may be predetermined and may be based on the nominal main supply input voltage VMAIN. For example, the reference voltage VREF may be trimmable/programmable to a percentage of the nominal main input supply VMAIN. For example, the reference voltage VREF may be about 50%, 55%, 60%, 65%, 70%, 75%, 80% or up to about 85% or more of the nominal main input supply VMAIN. Accordingly, the reference voltage VREF may be trimmed/programmed for each nominal main input supply.

Figure 4:
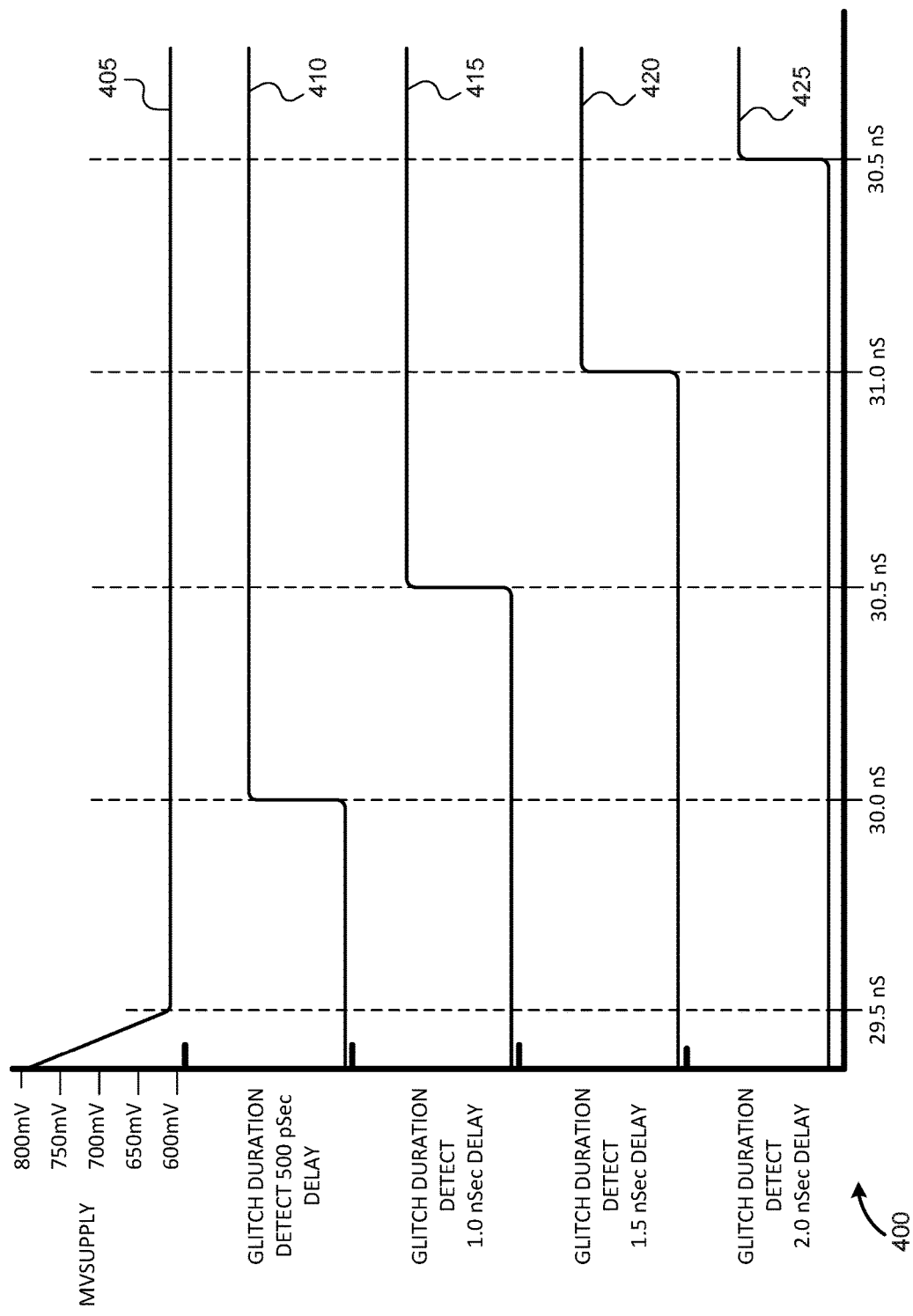
FIG. 4 depicts a set of glitch duration detection waveforms of an exemplary glitch detection subcircuit.

FIG. 4 depicts a set of glitch duration detection waveforms of an exemplary glitch detection subcircuit. A glitch detection response chart 400 includes a time domain MVSUPPLY response signal 405. The MVSUPPLY response signal 405 may be the monitored supply voltage MVSUPPLY of FIG. 2. In some examples, the MVSUPPLY response signal 405 may be the main supply voltage VMAIN, when the mode selection signal MODE_SEL is in the first logic state. In some examples, the MVSUPPLY response signal 405 may be the programmable test glitch from the test glitch generator 215 (FIG. 2), when the mode selection signal MODE_SEL in the second logic state.

The glitch detection response chart 400 includes four exemplary time domain glitch duration detection response signals 410, 415, 420 and 425. The glitch duration detection signals 410, 415, 420 and 425 may be specific examples of the depth-plus-width detection signal DEPTH+WIDTH_DET of FIG. 2. In some examples, the glitch duration detection signals 410, 415, 420 and 425 may activate (e.g., go high) in response to the duration of a glitch on the glitch depth detection signal DEPTH_DET reaching or exceeding a programmed glitch width according to the glitch width select signal GLITCH_WIDTH_SEL.

In the depicted example of FIG. 4, a glitch is initiated on MVSUPPLY 405 at 29.5 nS. The glitch is received by a glitch duration filter, such as the glitch duration filter 255 (FIG. 2). The 500 pS glitch duration detection response signal 410 depicts the output response of a glitch duration filter in response to an input glitch of 500 pS or more. The 1.0 nS glitch duration detection response signal 415 depicts the output response of a glitch duration filter in response to an input glitch of 1.0 nS or more. The 1.5 nS glitch duration detection response signal 420 depicts the output response of a glitch duration filter in response to an input glitch of 1.5 nS or more. The 2.0 nS glitch duration detection response signal 425 depicts the output response of a glitch duration filter in response to an input glitch of 2.0 nS or more.

Figure 5:
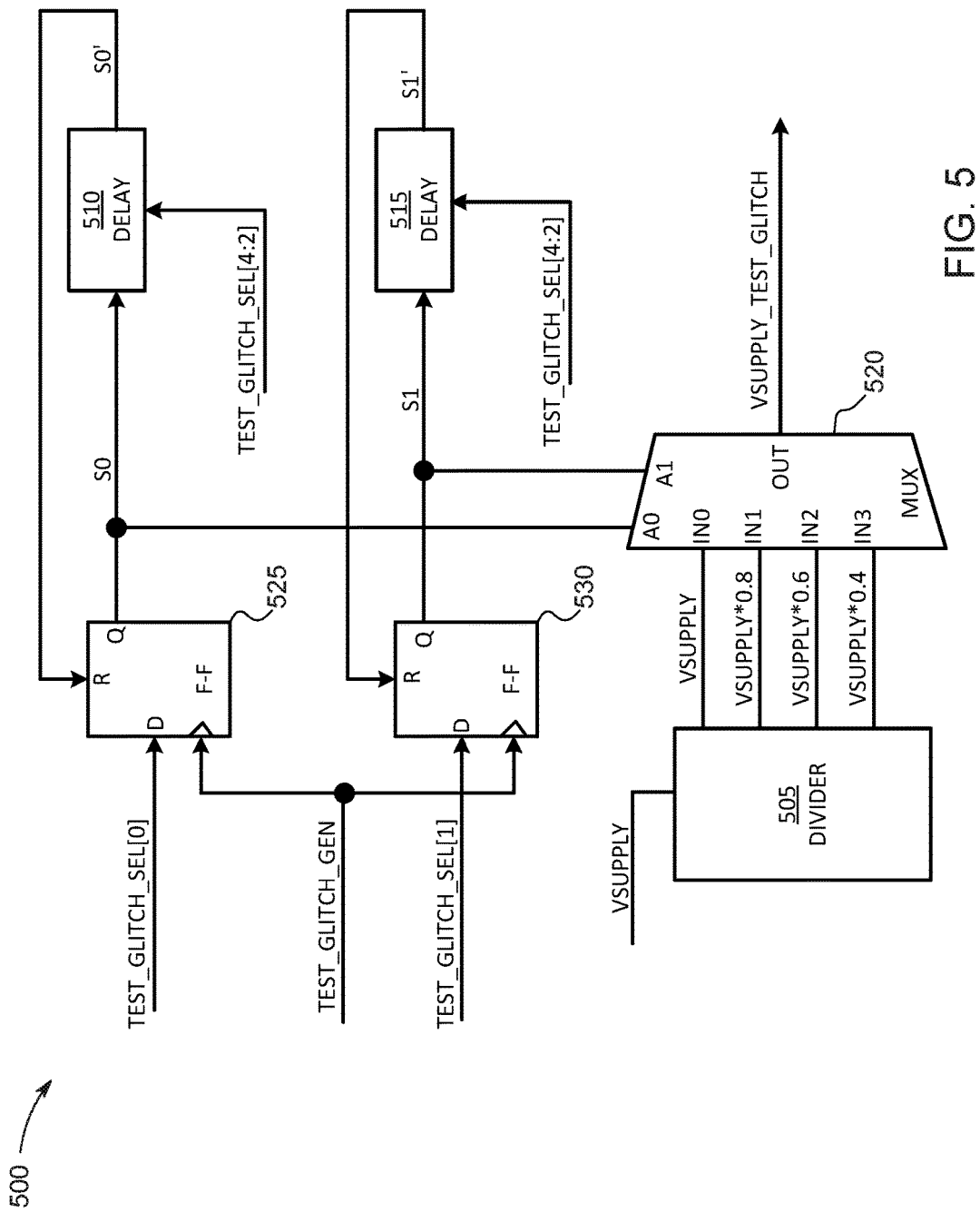
FIG. 5 depicts an exemplary test glitch generator implementation of an exemplary input selection subcircuit.

FIG. 5 depicts an exemplary test glitch generator implementation of an exemplary input selection subcircuit. A test glitch generator 500 may be configured to produce a test glitch of a depth determined by a voltage divider 505, and of a width/duration determined by programmable delay modules 510 and 515. In some examples, a depth may be a dropped voltage level from a nominal value. For example, the MVSUPPLY response signal 305 (FIG. 3) includes five glitches each with successively larger depths.

The voltage divider 505 receives an input supply voltage signal VSUPPLY. The voltage divider 505 is configured to divide the input supply voltage VSUPPLY into 20% divided supply levels as depicted VSUPPLY, VSUPPLY*0.8, VSUPPLY*0.6, and VSUPPLY*0.4. In some embodiments, the divided supply levels may be preconfigured to suit the application, for example, the divided supply levels may be 10% or 5% increments. In some embodiments, the divided supply levels may be non-monotonic.

A multiplexer 520 receives the divided supply levels from the voltage divider 505. The multiplexer 520 selects one of the divided supply levels in response to input address signals S0 and S1. The selected divided supply level is produced at the output of the multiplexer 520 as a resulting test glitch VSUPPLY_TEST_GLITCH. The address signals S0 and S1 are generated by flip-flops 525 and 530. The flip-flops 525 and 530 receive a clock signal TEST_GLITCH_GEN. The flip-flops 525 and 530 also receive a data bit TEST_GLITCH_SEL[0] and TEST_GLITCH_SEL[1] respectively. The flip-flops 525 and 530 generate the address signals S0 and S1 in response to the input data bits TEST_GLITCH_SEL[0], TEST_GLITCH_SEL[1] and the clock signal TEST_GLITCH_GEN. The programmable delay modules 510 and 515 receive the address signals S0 and S1 and delay the address signals S0 and S1 according to a delay control signal TEST_GLITCH_SEL[4:2]. Resulting delayed address signals S0' and S1' from the programmable delay modules 510 and 515 reset the flip-flops 525 and 530. An illustrative example of the operation is described with reference to FIG. 6.

Various implementations of delay control signals (e.g., TEST_GLITCH_SEL[4:2]) may select delays of, for example, about 500, 1000, 1500, 2000, 2500, 3000, 3500, 4000, 4500 or up to about 5000 pS or more. Various delay control signals may include one or more address bits, for example, four bits as in TEST_GLITCH_SEL[5:2] selecting 16 delays or, for example, five bits as in TEST_GLITCH_SEL[6:2] selecting 32 delays.

Various implementations of address signals (e.g., S0, S1) may select glitch depths of, for example, about 5%, 10%, 15%, 20%, 25%, 30%, 35%, 40%, 45% or up to about 50% or more. Various address signals may include additional address bits, for example, three bits S0, S1, and S2 selecting eight glitch depths or, for example, four bits S0, S1, S2 and S3 selecting 16 glitch depths.

Figure 6:
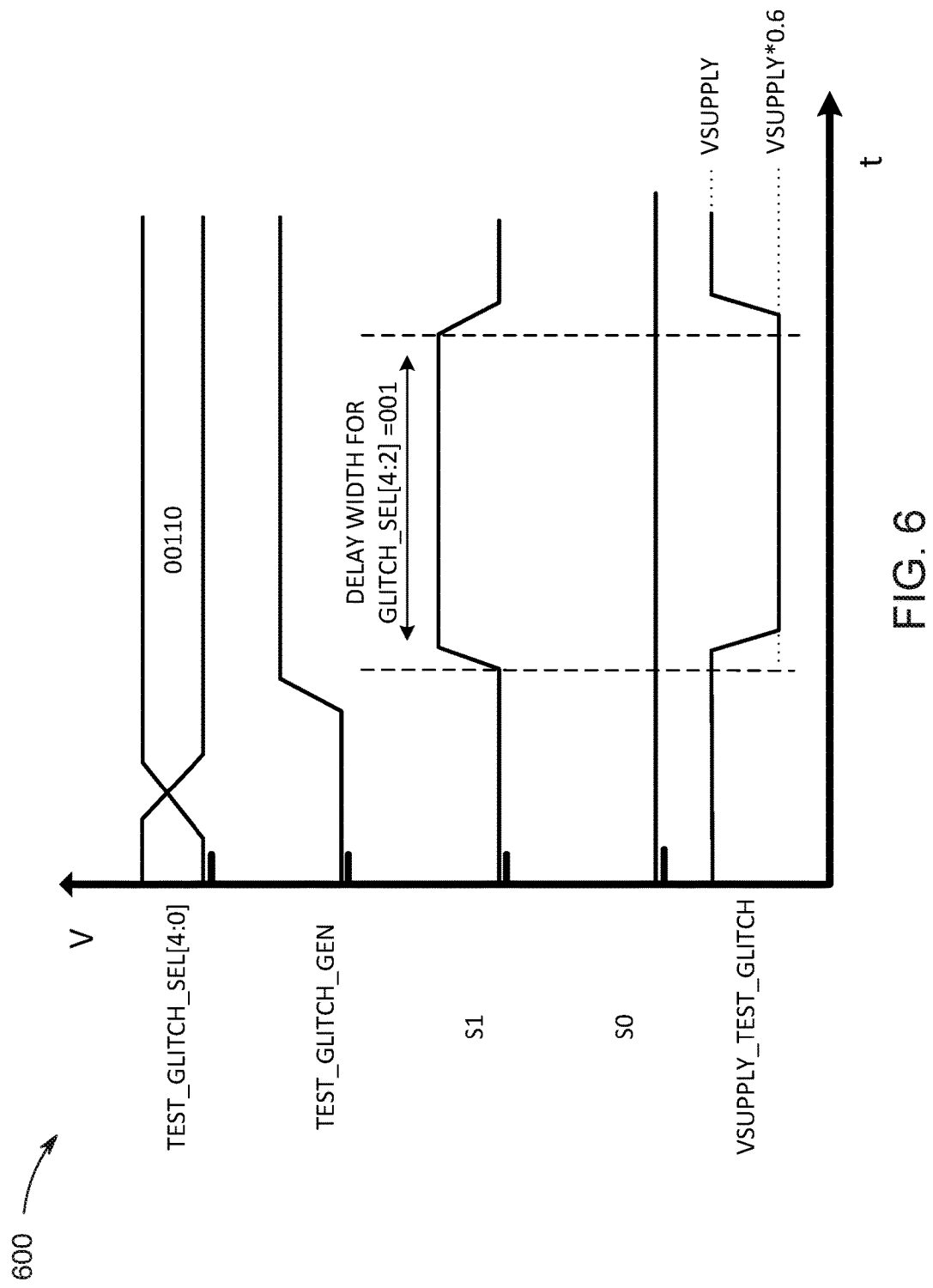
FIG. 6 depicts a set of test glitch generator output waveforms from the exemplary test glitch generator implementation.

FIG. 6 depicts a set of test glitch generator output waveforms from the exemplary test glitch generator implementation. A glitch generator signal chart 600 includes a test glitch selection signal TEST_GLITCH_SEL[4:0]. The test glitch selection signal TEST_GLITCH_SEL[4:0] includes, with reference to FIG. 5, input data bits TEST_GLITCH_SEL[0], TEST_GLITCH_SEL[1] and includes the delay control signal TEST_GLITCH_SEL[4:2]. The glitch generator signal chart 600 includes, with reference to FIG. 5, the clock signal TEST_GLITCH_GEN, the address signals S0, S1, and the resulting test glitch VSUPPLY_TEST_GLITCH.

In operation, as depicted in the glitch generator signal chart 600, and according to the test glitch generator 500 (FIG. 5), a logic level test glitch may be produced on address signal(s) S0 and/or S1 and may control the formation of a test glitch with an associated test glitch depth on the resulting test glitch VSUPPLY_TEST_GLITCH. The logic level test glitch durations (e.g., test glitch widths) produced on address signal(s) S0 and/or S1 may be controlled by the delay control signal TEST_GLITCH_SEL[4:2]. The test glitch depths produced on the resulting test glitch VSUPPLY_TEST_GLITCH may be controlled by the address signals S0 and S1. The address signals S0 and S1 may be formed in response to the input data bits TEST_GLITCH_SEL[0] and TEST_GLITCH_SEL[1] clocked by the clock signal TEST_GLITCH_GEN through the flip-flops 525 and 530.

Turning now to the depicted example waveforms in FIG. 6, and according to the circuit implementation of FIG. 5, the test glitch selection signal TEST_GLITCH_SEL[4:0] is set to 00110. The test glitch selection signal TEST_GLITCH_SEL[4:0] may be produced, for example, by a platform management controller (PMC). In response to the positive edge of the clock signal TEST_GLITCH_GEN, the input data bits TEST_GLITCH_SEL[0], TEST_GLITCH_SEL[1] are clocked out of the flip-flops 525 and 530, as address signals S0 and S1 respectively. In the depicted example, input data bit TEST_GLITCH_SEL[1] is a logic 1 which is clocked out of the flip-flop 530, forming a leading edge and a logic 1 of glitch result on address signal S1. The flip-flop 530 holds the logic 1 result on address signal S1 as the programmable delay module 515 produces the delayed address signal S1'. The delayed address signal S1' is a delayed version of the address signal S1. The delay value is set by the delay control signal TEST_GLITCH_SEL[4:2]. Once the delay value elapses, the delayed address signal S1' becomes a logic 1, (e.g., an activate reset signal) and resets the flip-flop 530 back to zero. Accordingly, the flip-flop 530 forms a glitch on address signal S1, the glitch having a duration determined by the delay control signal TEST_GLITCH_SEL[4:2].

Further, in the depicted example, the input data bit TEST_GLITCH_SEL[0] is a logic 0 which is clocked out of the flip-flop 525 forming a flat (no glitch) result on address signal S0. The flip-flop 525 holds the logic 0 result on address signal S0, as the programmable delay module 510 produces the delayed address signal S0'. The delayed address signal S0' is a delayed version of the address signal S0. The delay value is set by the delay control signal TEST_GLITCH_SEL[4:2]. Once the delay value elapses, the delayed address signal S0' remains at a logic zero (e.g., a non-activate reset signal). The flip-flop 525 is not reset back to zero. Accordingly, the flip-flop 525 forms no glitch on address signal S0.

Further, address signals S0 and S1 determine an associated divided monitor voltage from the set of divided monitor voltages to select and produce on the resulting test glitch VSUPPLY_TEST_GLITCH of the multiplexer 520. The resulting test glitch VSUPPLY_TEST_GLITCH may have a width as determined by the delay control signal TEST_GLITCH_SEL[4:2], and may have a depth as selected by the input data bits TEST_GLITCH_SEL[0], TEST_GLITCH_SEL[1], the input data bits may form an address selecting one of the divided monitor voltages preconfigured in, and output by the voltage divider 505.

Figure 7:
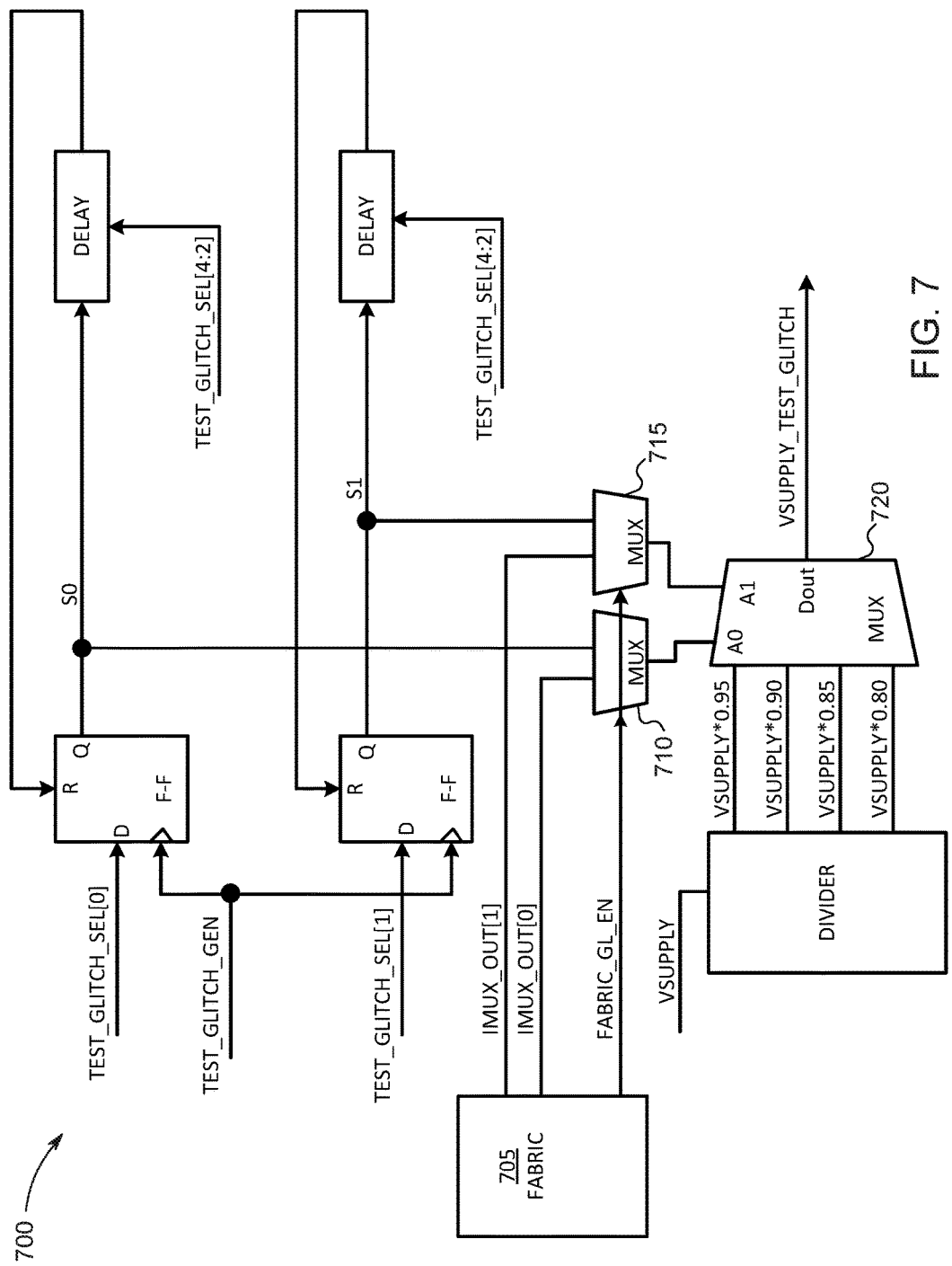
FIG. 7 depicts an exemplary test glitch generator implementation using preprogrammed fabric.

FIG. 7 depicts an exemplary test glitch generator implementation using preprogrammed fabric. A test glitch generator 700 includes an FPGA fabric implementation 705. The fabric implementation 705 may be included in a full FPGA fabric implementation. In some examples, the fabric implementation 705 may be a software implementation and, in some examples, may be implemented in a hardware description language (HDL).

In the depicted example of FIG. 7, the fabric implementation 705 determines a test glitch depth by encoding a glitch depth address onto signals IMUX_OUT[0] and IMUX_OUT[1] and may determine the test glitch duration by the duration of the signals IMUX_OUT[0] and IMUX_OUT[1]. The fabric implementation 705 generates a control signal FABRIC_GL_EN to control a set of multiplexers 710 and 715. The control signal FABRIC_GL_EN determines the source of the encoded glitch depth and duration address.

For example, in a first logic state, the control signal FABRIC_GL_EN may pass address signals S0 and S1 to a multiplexer 720, such that the test glitch generator 700 may implement similar functionality of the test glitch generator 500 (FIG. 5). In a second logic state, the control signal FABRIC_GL_EN may pass the signals IMUX_OUT[0] and IMUX_OUT[1] to allow the fabric implementation 705 to control the test glitch depth and duration. In some embodiments, the test glitch selection signal TEST_GLITCH_SEL[4:0] and/or the clock signal TEST_GLITCH_GEN may be generated by the fabric implementation 705.

In some implementations, a test glitch generator may be collocated with other integrated circuits (ICs) for which the glitch detector is securing. For example, various test glitch generators may be collocated (e.g., built-in) on a semiconductor wafer or may be collocated on a common substrate within an IC package. Various examples of collocated test glitch generators may provide test vectors to test the functionality of various glitch detection features. Various exemplary test glitch generation implementations may produce glitches as low as, for example, 0.5 nS on a supply voltage. In some test glitch generator implementations, support for multiple sources of glitch generation may be provided, for example, glitch generation through FPGA fabric.

Figure 8:
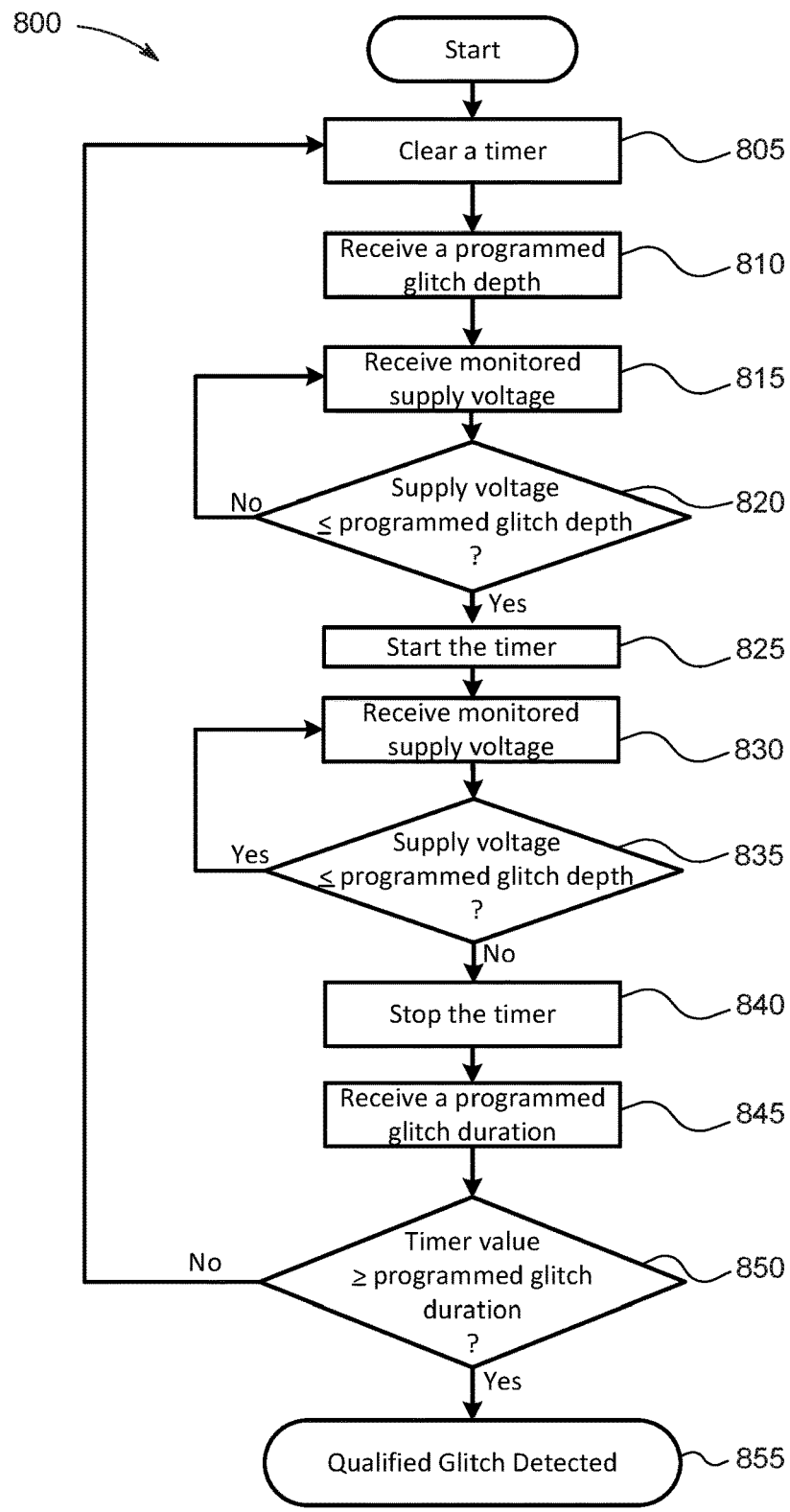
FIG. 8 depicts an exemplary glitch detection flowchart.

FIG. 8 depicts an exemplary glitch detection flowchart. A glitch detection process 800 starts by clearing a timer 805. Next, a programmed glitch depth voltage is received 810 and a monitored supply voltage is received 815. Next, the glitch detection process 800 compares the received supply voltage with the programmed glitch depth voltage 820. If the received supply voltage is greater than the selected glitch depth voltage, then the monitored supply voltage is received 815 again. If the received supply voltage is less than or equal to the programmed glitch depth voltage, then the timer is started 825.

Next, the monitored supply voltage is received 830. Next, the glitch detection process 800 compares the received supply voltage with the programmed glitch depth voltage 835. If the received supply voltage is less than or equal to the programmed glitch depth voltage, then the monitored supply voltage is received 830 again. If the received supply voltage is greater than the programmed glitch depth voltage, then the timer is stopped 840.

Next, a programmed glitch duration is received 845. Next, the glitch detection process 800 compares the timer value with the programmed glitch duration 850. If the timer value is less than the programmed glitch duration, then the timer is cleared 805 restarting the glitch detection process 800. If the timer value is greater than or equal to the programmed glitch duration, then a qualified glitch is detected 855. In various examples, the glitch detection process 800 may generate a glitch detection signal in response to the duration of a depth detection signal exceeding a selected glitch width responsive to a glitch width selection signal.

Figure 9:
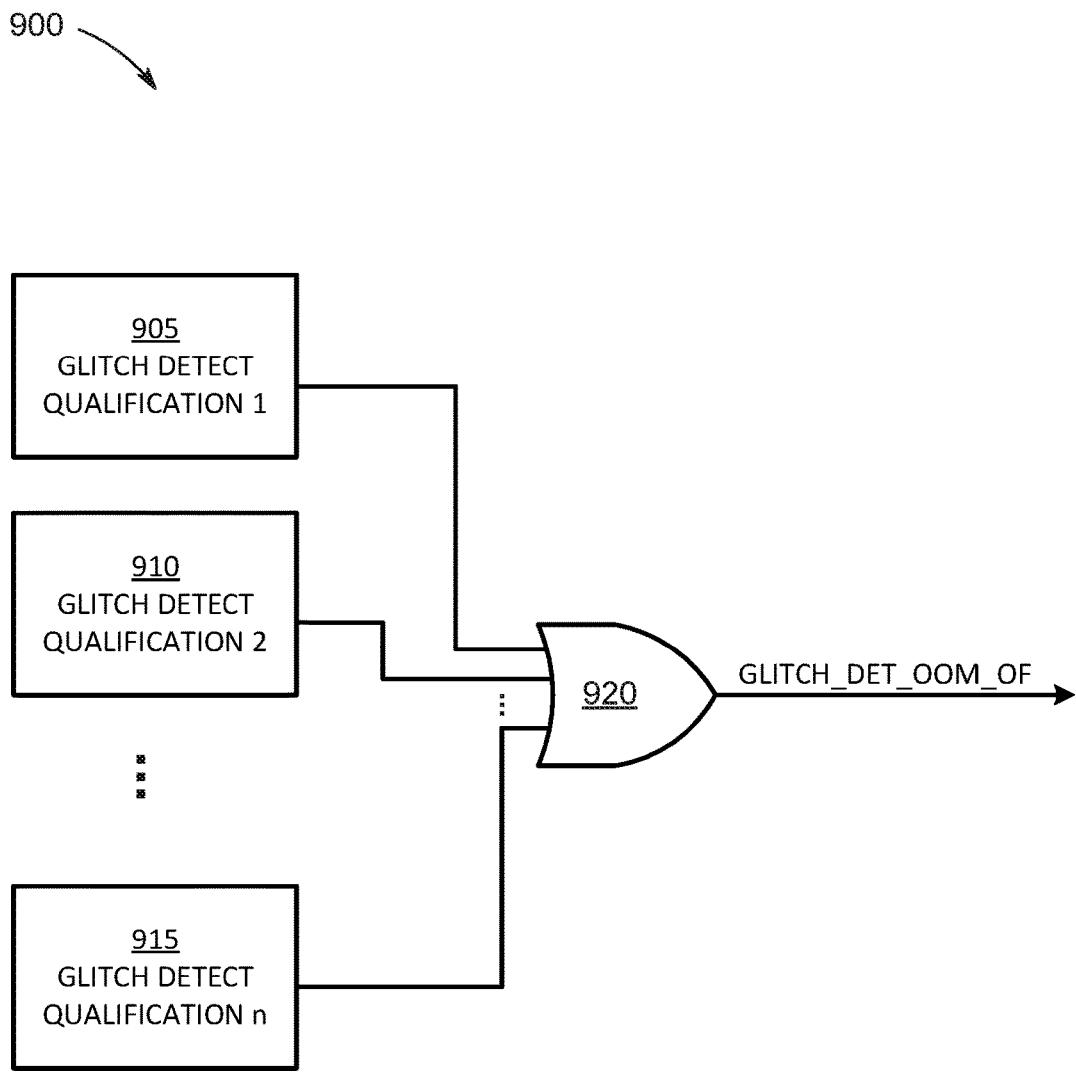
FIG. 9 depicts an OR'ed implementation of exemplary test glitch generators configured to detect two or more distinct glitch qualifications.

FIG. 9 depicts an OR'ed implementation of exemplary test glitch generators configured to detect two or more distinct glitch qualifications. A circuit application 900 includes glitch detectors 905, 910 and 915. Each glitch detector may be configured to detect distinct glitch types, for example, glitch detector 905 may be configured to detect glitches below 0.80V for 20 nS, glitch detector 910 may be configured to detect glitches below 0.75V for 10 nS, and glitch detector 915 may be configured to detect glitches below 0.70V for 5 nS. Accordingly, by OR'ing outputs of the glitch detectors 905, 910 and 915 with an OR gate 920, the circuit application 900 may detect glitches of shorter durations (e.g., 5 nS) when they are deeper (e.g., 0.70 V) in amplitude, while retaining the ability to detect shallower glitches (e.g., 0.80 V) when they are longer in duration (e.g., 20 nS), for example. Various IC tamper detection circuits may include two or more glitch detection circuits (e.g., glitch detectors 905, 910 and 915), which are logically OR'ed to produce a one-or-more-of glitch detection signal (GLITCH_DET_OOM_OF). In various examples, the glitch detectors 905, 910 and 915 may be glitch detection subcircuits 205 (FIG. 2).

Figure 10:
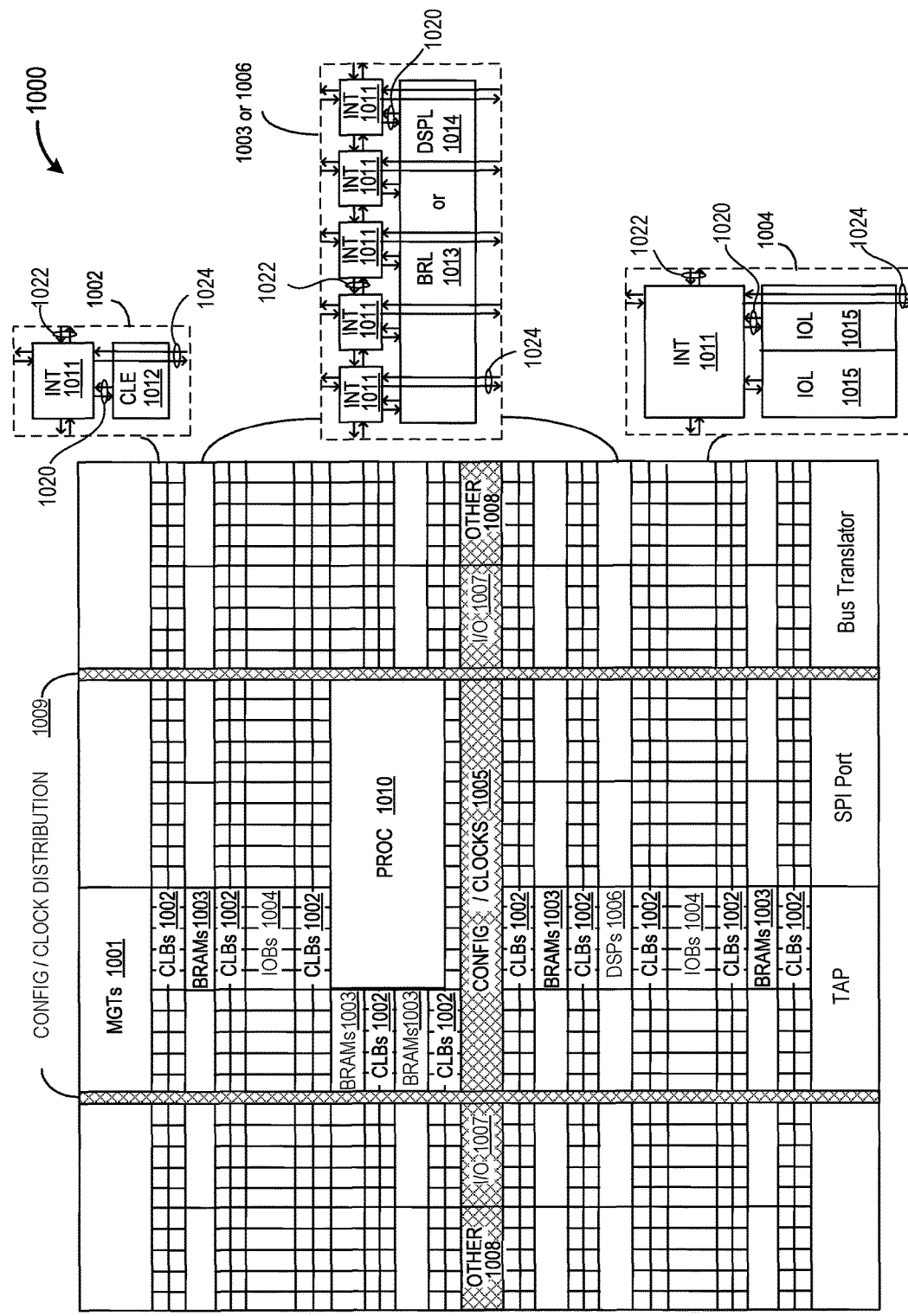
FIG. 10 depicts an exemplary programmable integrated circuit (IC) on which the disclosed circuits and processes may be implemented.

FIG. 10 depicts an exemplary programmable integrated circuit (IC) on which the disclosed circuits and processes may be implemented. A programmable IC 1000 includes FPGA logic. The programmable IC 1000 may be implemented with various programmable resources and may be referred to as a System on Chip (SOC). Various examples of FPGA logic may include several diverse types of programmable logic blocks in an array.

For example, FIG. 10 illustrates a programmable IC 1000 that includes a large number of different programmable tiles including multi-gigabit transceivers (MGTs) 1001, configurable logic blocks (CLBs) 1002, blocks of random access memory (BRAMs) 1003, input/output blocks (IOBs) 1004, configuration and clocking logic (CONFIG/CLOCKS) 1005, digital signal processing blocks (DSPs) 1006, specialized input/output blocks (I/O) 1007 (e.g., clock ports), and other programmable logic 1008 (e.g., digital clock managers, analog-to-digital converters, system monitoring logic). The programmable IC 1000 includes dedicated processor blocks (PROC) 1010. The programmable IC 1000 may include internal and external reconfiguration ports (not shown).

In various examples, a serializer/deserializer may be implemented using the MGTs 1001. The MGTs 1001 may include various data serializers and deserializers. Data serializers may include various multiplexer implementations. Data deserializers may include various demultiplexer implementations.

In some examples of FPGA logic, each programmable tile includes a programmable interconnect element (INT) 1011 having standardized inter-connections 1024 to and from a corresponding interconnect element in each adjacent tile. Therefore, the programmable interconnect elements taken together implement the programmable interconnect structure for the illustrated FPGA logic. The programmable interconnect element INT 1011 includes the intra-connections 1020 to and from the programmable logic element within the same tile, as shown by the examples included in FIG. 10. The programmable interconnect element INT 1011 includes the inter-INT-connections 1022 to and from the programmable interconnect element INT 1011 within the same tile, as shown by the examples included in FIG. 10.

For example, a CLB 1002 may include a configurable logic element (CLE) 1012 that may be programmed to implement user logic, plus a single programmable interconnect element INT 1011. A BRAM 1003 may include a BRAM logic element (BRL) 1013 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 1006 may include a DSP logic element (DSPL) 1014 and one or more programmable interconnect elements. An 10B 1004 may include, for example, two instances of an input/output logic element (IOL) 1015 and one instance of the programmable interconnect element INT 1011. The actual I/O bond pads connected, for example, to the I/O logic element 1015, may be manufactured using metal layered above the various illustrated logic blocks, and may not be confined to the area of the input/output logic element 1015.

In the pictured implementation, a columnar area near the center of the die (shown shaded in FIG. 10) is used for configuration, clock, and other control logic. Horizontal areas 1009 extending from the column distribute the clocks and configuration signals across the breadth of the programmable IC 1000. Note that the references to "columnar" and "horizontal" areas are relative to viewing the drawing in a portrait orientation.

Some programmable ICs utilizing the architecture illustrated in FIG. 10 may include additional logic blocks that disrupt the regular columnar structure making up a large part of the programmable IC. The additional logic blocks may be programmable blocks and/or dedicated logic. For example, the processor block PROC 1010 shown in FIG. 10 spans several columns of CLBs 1002 and BRAMs 1003.

FIG. 10 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 1002 may be included wherever the CLBs 1002 appear, to facilitate the efficient implementation of user logic.

Although various embodiments have been described with reference to the figures, other embodiments are possible. For example, various implementations may advantageously safeguard against operation of an IC in an illegal supply range. For example, some embodiments may safeguard against operation of an IC for applied supply voltages that are below a minimum operating supply voltage, that are above a minimum power-on reset (POR) voltage and that meet a minimum glitch duration criterium. Some embodiments may safeguard against operation of an IC for applied supply voltages that are below the minimum operating supply voltage, that are above the maximum POR voltage and that meet the minimum glitch duration criterium. Some embodiments may safeguard against operation of an IC for applied supply voltages that are below a minimum operating supply voltage and that meet the minimum glitch duration criterium.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits, for example, FPGAs and application specific integrated circuits (ASICs). In some embodiments, the module(s) may involve execution of preprogrammed instructions and/or software executed by a processor. For example, various modules may involve both hardware and software.

Various examples of glitch detectors may be implemented in various IC sections, for example, in various power-on-reset POR circuits. The exemplary glitch detectors may detect glitches on various IC power supply inputs. For example, some IC glitch detectors monitoring one or more IC main supply inputs may produce a glitch detection on one or more outputs. The glitch detection output(s) may be qualified by (e.g., logically and'ed with) a power-on-reset signal. The qualification may provide an output that is only valid when the IC is in normal operation (e.g., not in power-on-reset).

In an exemplary aspect, an integrated circuit (IC) tamper detection apparatus may include a glitch detection circuit configured to receive a predetermined reference voltage signal (VREF) and a monitored supply voltage signal (MVSUPPLY), which may be a function of a main supply voltage signal (VMAIN) The VMAIN may be configured to supply operating power to a target circuit. The glitch detection circuit may include a first voltage divider configured to generate one or more voltage signals, each of the voltage signals may represent a fraction of the MVSUPPLY voltage.

The glitch detection circuit may include a first selection circuit configured to select one of the plurality of voltage signals in response to a glitch depth selection signal. The glitch detection circuit may include a comparator operably coupled to receive and compare the selected one of the plurality of voltage signals and the VREF to generate a depth detection signal (DEPTH_DET) in response to the MVSUPPLY transitioning from a nominal supply voltage range for the target circuit to a range between a minimum operating voltage and a power-on-reset voltage threshold for the target circuit.

The glitch detection circuit may include a glitch duration filter configured to receive the DEPTH_DET and a glitch width selection signal. The glitch duration filter may be configured to generate a glitch detection signal (DEPTH+WIDTH_DET) in response to the duration of the depth detection signal (DEPTH_DET) exceeding a selected glitch width responsive to the glitch width selection signal.

The integrated circuit (IC) tamper detection apparatus may include an input selection circuit configured to generate the MVSUPPLY. The input selection circuit may include a test glitch generator configured to generate a test glitch signal, and a second selection circuit configured to generate the MVSUPPLY by selecting between the VMAIN and the test glitch signal.

The glitch detection circuit may include a latch configured to generate a latched glitch detection signal (GLITCH_DET_LATCHED) in response to the DEPTH+WIDTH_DET. The test glitch generator may be configured to generate a test glitch signal in response to a signal indicating an amplitude and a duration of the test glitch signal. The test glitch generator may include a second voltage divider configured to generate one or more test voltage signals, each of the test voltage signals representing a fraction of a test supply voltage. The test glitch generator may include a third selection circuit configured to select one of the plurality of test voltage signals.

The IC tamper detection apparatus may include at least two of the glitch detection circuits. Each of the at least two glitch detection circuits may receive a unique combination of the glitch depth selection signal and the glitch width selection signal. The glitch detection circuit may be configured to receive its operating power from a supply voltage signal sourced with respect to the VMAIN. The IC tamper detection apparatus may include a reference and supply circuit configured to generate and regulate the VREF. The reference and supply circuit may include a regulator to generate and supply power to the glitch detection circuit. The comparator may be operable to compare the selected one of the plurality of voltage signals and the VREF to generate a depth detection signal (DEPTH_DET) in response to the MVSUPPLY transitioning from a nominal supply voltage range for the target circuit to a range between a minimum operating voltage and a minimum specified power-on-reset voltage threshold for the target circuit.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An integrated circuit (IC) tamper detection apparatus comprising:
    a glitch detection circuit configured to receive a predetermined reference voltage signal (VREF) and a monitored supply voltage signal (MVSUPPLY), which is a function of a main supply voltage signal (VMAIN) configured to supply operating power to a target circuit, the glitch detection circuit comprising:
    a first voltage divider configured to generate a plurality of voltage signals, each of the voltage signals representing a fraction of the MVSUPPLY voltage,
    a first selection circuit configured to select one of the plurality of voltage signals in response to a glitch depth selection signal;
    a comparator operably coupled to receive and compare the selected one of the plurality of voltage signals and the VREF to generate a depth detection signal (DEPTH_DET) in response to the MVSUPPLY transitioning from a nominal supply voltage range for the target circuit to a range between a minimum operating voltage and a power-on-reset voltage threshold for the target circuit; and,
    a glitch duration filter configured to receive the DEPTH_DET and a glitch width selection signal, the glitch duration filter configured to generate a glitch detection signal (DEPTH+WIDTH_DET) in response to the duration of the depth detection signal (DEPTH_DET) exceeding a selected glitch width responsive to the glitch width selection signal.

2. The IC tamper detection apparatus of claim 1, wherein the glitch detection circuit further comprises a latch configured to generate a latched glitch detection signal (GLITCH_DET_LATCHED) in response to the DEPTH+WIDTH_DET.

3. The IC tamper detection apparatus of claim 1, further comprising an input selection circuit configured to generate the MVSUPPLY, the input selection circuit comprising a test glitch generator configured to generate a test glitch signal, and a second selection circuit configured to generate the MVSUPPLY by selecting between the VMAIN and the test glitch signal.

4. The IC tamper detection apparatus of claim 3, wherein the test glitch generator is further configured to generate a test glitch signal in response to a signal indicating an amplitude and a duration of the test glitch signal.

5. The IC tamper detection apparatus of claim 4, wherein the test glitch generator comprises a second voltage divider configured to generate a plurality of test voltage signals, each of the test voltage signals representing a fraction of a test supply voltage.

6. The IC tamper detection apparatus of claim 5, wherein the test glitch generator further comprises a third selection circuit configured to select one of the plurality of test voltage signals.

7. The IC tamper detection apparatus of claim 1, further comprising at least two of the glitch detection circuits, wherein each of the at least two glitch detection circuits receives a unique combination of the glitch depth selection signal and the glitch width selection signal.

8. The IC tamper detection apparatus of claim 1, the glitch detection circuit further configured to receive its operating power from a supply voltage signal sourced with respect to the VMAIN.

9. The IC tamper detection apparatus of claim 1, further comprising a reference and supply circuit configured to generate and regulate the VREF.

10. The IC tamper detection apparatus of claim 9, wherein the reference and supply circuit further comprises a regulator to generate and supply power to the glitch detection circuit.

11. The IC tamper detection apparatus of claim 1, wherein the comparator is further operable to compare the selected one of the plurality of voltage signals and the VREF to generate a depth detection signal (DEPTH_DET) in response to the MVSUPPLY transitioning from a nominal supply voltage range for the target circuit to a range between a minimum operating voltage and a minimum specified power-on-reset voltage threshold for the target circuit.

12. A method of operating an integrated circuit (IC), the method comprising:
receiving, with a glitch detection circuit, a predetermined reference voltage signal (VREF) and a monitored supply voltage signal (MVSUPPLY), which is a function of a main supply voltage signal (VMAIN) configured to supply operating power to a target circuit, the glitch detection circuit operable to perform operations comprising:
generating, with a first voltage divider, a plurality of voltage signals, each of the voltage signals representing a fraction of the MVSUPPLY voltage,
selecting, with a first selection circuit, one of the plurality of voltage signals in response to a glitch depth selection signal;
receive and compare, with a comparator, the selected one of the plurality of voltage signals and the VREF to generate a depth detection signal (DEPTH_DET) in response to the MVSUPPLY transitioning from a nominal supply voltage range for the target circuit to a range between a minimum operating voltage and a power-on-reset voltage threshold for the target circuit; and,
receiving, with a glitch duration filter, the DEPTH_DET and a glitch width selection signal, the glitch duration filter configured to generate a glitch detection signal (DEPTH+WIDTH_DET) in response to the duration of the depth detection signal (DEPTH_DET) exceeding a selected glitch width responsive to the glitch width selection signal.

13. The method of claim 12, the glitch detection circuit operable to perform operations comprising generating, with a latch, a latched glitch detection signal (GLITCH_DET_LATCHED) in response to the DEPTH+WIDTH_DET.

14. The method of claim 12, further comprising generating, with an input selection circuit, the MVSUPPLY, the input selection circuit comprising a test glitch generator configured to generate a test glitch signal, and a second selection circuit configured to generate the MVSUPPLY by selecting between the VMAIN and the test glitch signal.

15. The method of claim 14, further comprising generating, with the test glitch generator, a test glitch signal in response to a signal indicating an amplitude and a duration of the test glitch signal.

16. The method of claim 15, wherein the test glitch generator comprises a second voltage divider, and the method further comprises generating, with the second voltage divider, a plurality of test voltage signals, each of the test voltage signals representing a fraction of a test supply voltage.

17. The method of claim 16, wherein the test glitch generator further comprises a third selection circuit, and the method further comprises selecting, with the third selection circuit, one of the plurality of test voltage signals.

18. The method of claim 12, further comprising generating and regulating the VREF with a reference and supply circuit.

19. The method of claim 18, wherein the reference and supply circuit further comprises a regulator, and the method further comprises generating and supplying power, with the regulator, to the glitch detection circuit.

20. The method of claim 12, further comprising comparing, with the comparator, the selected one of the plurality of voltage signals and the VREF to generate a depth detection signal (DEPTH_DET) in response to the MVSUPPLY transitioning from a nominal supply voltage range for the target circuit to a range between a minimum operating voltage and a minimum specified power-on-reset voltage threshold for the target circuit.

* * * * *